US008522023B2

(12) United States Patent  
Agarwal et al.

(10) Patent No.: US 8,522,023 B2  
(45) Date of Patent: Aug. 27, 2013

(54) RURAL SERVICES PLATFORM

(75) Inventors: Vikas Agarwal, Noida (IN); Anupam Joshi, Ellicott City, MD (US); Shalini Kapoor, Hyderabad (IN); Sumit Mittal, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 13/102,177

(22) Filed: May 6, 2011

(65) Prior Publication Data

US 2012/0284512 A1     Nov. 8, 2012

(51) Int. Cl.  
*H04L 9/00*     (2006.01)  
*H04L 9/32*     (2006.01)

(52) U.S. Cl.  
USPC .......................................... 713/168; 713/189

(58) Field of Classification Search  
USPC ........... 713/168–170, 189; 726/2–8; 705/64, 705/67, 70  
See application file for complete search history.

(56) References Cited

U.S. PATENT DOCUMENTS

| | | | | |
|---|---|---|---|---|
| 5,964,831 | A * | 10/1999 | Kearns et al. | 709/201 |
| 6,332,163 | B1 * | 12/2001 | Bowman-Amuah | 709/231 |
| 2005/0044197 | A1 * | 2/2005 | Lai | 709/223 |

FOREIGN PATENT DOCUMENTS

| | | |
|---|---|---|
| CN | 201331812 Y | 10/2009 |
| KR | 1020100025617 A | 10/2010 |

OTHER PUBLICATIONS

Alok Bhargava: "Extending Banking and Financial Services Through IT-enabled Kiosks: Challenges and Opportunities", CAB Calling, Jan.-Mar. 2007, 58-62.  
Dr. Satchidananda Sogala, "Enabling Rural Banking through Technology", [online]; [retrieved on Dec. 3, 2010]; retrieved from the Internet http://srichidsirvice.com/downloads/GANASEVA0MODEL_enabling_rural_banking.pdf, 20 pp.  
"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.  
Gao Li, "Research on Multi-Service Terminal Adapter based IP Technology", 2007 International Conference on Convergence Information Tecnology, IEEE Computer Society, 2040-2042.  
Mahesh Jain, "A Unified Approach for Branchless Banking for Inclusive Growth", [online]; [retrieved on Aug. 31, 2010]; retrieved from the Internet http://www.inclusion.in/index.php?option=com_content&view=article&i, 2 pp.  
Santosh Khanolkar, "Transforming Primary Agricultural Credit Societies Into Village Knowledge Centers (VKCs)—An Approach Paper", Microsoft Corporation (India) Pvt. Ltd., Mumbai 400 021, India, Oct. 10, 2007.

* cited by examiner

*Primary Examiner* — Hosuk Song  
(74) *Attorney, Agent, or Firm* — Cantor Colburn LLP (57) ABSTRACT

A middleware platform is executable by a computer to receive a request for a service, the service provided by a service application in communication with the middleware platform. The middleware platform determines, via a device adaptation component of the middleware platform, capabilities of a device subject to the request. The middleware platform selects an interface having a format that is compatible with the capabilities of the device, and provides the interface to the device in a format corresponding to the capabilities, accesses the service application responsive to the request, processes the request, and returns a response, via the interface, to the device responsive to the processing.

20 Claims, 6 Drawing Sheets

RURAL SERVICES PLATFORM

BACKGROUND

The present invention relates to computer-based service delivery, and more specifically, to a rural services platform for providing services to rural locations.

In a typical census, various geographical locations are defined by their population densities. For example, the United States Census Bureau defines a rural area as open country having settlements with fewer than 2,500 residents. Areas designated as rural can have population densities as high as 999 per square mile or as low as 1 person per square mile. As much as 80 percent of the United States' population has been classified as rural. Catering to the needs of populations living in rural communities, whether they live in the United States or in other countries abroad, presents many challenges due to, for example, difficulty in physically accessing geographically dispersed populations, financial constraints in providing low-cost and affordable services, and limited communication infrastructure. In many rural locations, these populations are known to produce less income and commonly receive fewer services than their urban counterparts.

In an effort to address these concerns, many types of organizations (e.g., non-governmental organizations, or NGOs) have been established that seek to reach out to communities that may not otherwise receive the goods and services enjoyed by more densely populated communities. Oftentimes, this means traveling to these areas to work face-to-face with rural community members.

SUMMARY

According to one embodiment of the present invention, a system for providing services to a rural region is provided. The system includes a computer and a middleware platform executable by the computer. The middleware platform includes components configured in logic to implement a method. The method includes receiving a request for a service, the service provided by a service application in communication with the middleware platform. The method includes determining, via a device adaptation component of the middleware platform, capabilities of a device subject to the request. The method further includes selecting an interface having a format that is compatible with the capabilities of the device, and providing the interface to the device in a format corresponding to the capabilities. The method also includes accessing the service application responsive to the request, the service application including one or more of a banking application, a micro-finance application, an insurance application, and an employment application. The method also includes processing the request, and returning a response, via the interface, to the device responsive to the processing.

According to another embodiment of the present invention, a method for providing services to a rural region is provided. The method includes receiving a request for a service, the service provided by a service application in communication with a middleware platform. The middleware platform is executable by a computer and includes components configured in logic. The method also includes determining, via a device adaptation component of the middleware platform, capabilities of a device subject to the request. The method further includes selecting an interface having a format that is compatible with the capabilities of the device, and providing the interface to the device in a format corresponding to the capabilities. The method also includes accessing the service application responsive to the request, the service application including one or more of a banking application, a micro-finance application, an insurance application, and an employment application. The method also includes processing the request, and returning a response, via the interface, to the device responsive to the processing.

According to a further embodiment of the present invention, a computer program product for providing services to a rural region is provided. The computer program product includes a storage medium having computer-readable instructions embodied thereon, which when executed by a computer in the rural region, cause the computer to implement a method. The method includes receiving a request for a service, the service provided by a service application in communication with a middleware platform configured with the computer-readable instructions. The method also includes determining, via a device adaptation component of the middleware platform, capabilities of the device, selecting an interface having a format that is compatible with the capabilities of the device, and providing the interface to the device in a format corresponding to the capabilities. The method also includes accessing the service application responsive to the request, the service application including one or more of a banking application, a micro-finance application, an insurance application, and an employment application. The method further includes processing the request, and returning a response, via the interface, to the device responsive to the processing.

According to yet a further embodiment of the present invention, a system for providing services to a rural region is provided. The system includes a computer and a middleware platform executable by the computer. The middleware platform includes components configured in logic to implement a method. The method includes processing a transaction, via a service application of a back-end system, the service application communicating with an end user device through the middleware platform. The transaction processing includes conducting communications relating to the transaction with the end user device via one of a text and voice component of the middleware platform, synchronizing data from the transaction with the service application, via a synchronization component of the middleware platform, and completing the transaction by communicating the synchronized data over a connector coupled to the back-end system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, rural services and a rural service platform are provided. The rural service platform is a low cost shared model that brings interactive technologies used by a consumer or moderated by a facilitator for the consumer in order to provide financial, advisory, and business services to a rural populace. The rural services can be used by business correspondents who go into remote or rural villages to disburse payments, and by consumers directly (e.g., to conduct transactions through a voice channel). The rural services are configured to provide an array of services across industries, such as banking, finance, agriculture, health care, and education, in a scalable architecture thereby reducing the cost of delivery. The term rural, is used herein in context with a location or region, and specifies an under-populated or sparsely populated area that lacks the resources and services offered by its urban counterparts (e.g., technologic, economic, and/or other resources, such as banking, healthcare, insurance, education, and transportation, to name a few).

At least a portion of the rural services may be implemented on a cloud infrastructure as middleware and resources that enable dynamic over-the-Internet provisioning of scalable and virtualized resources. This allows a platform provider of the rural services to optimize its cost initially when the number of services and/or users is few, while supporting scalability as the number of services/users grows. Moreover, this may increase the overall reliability and performance of the entire system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
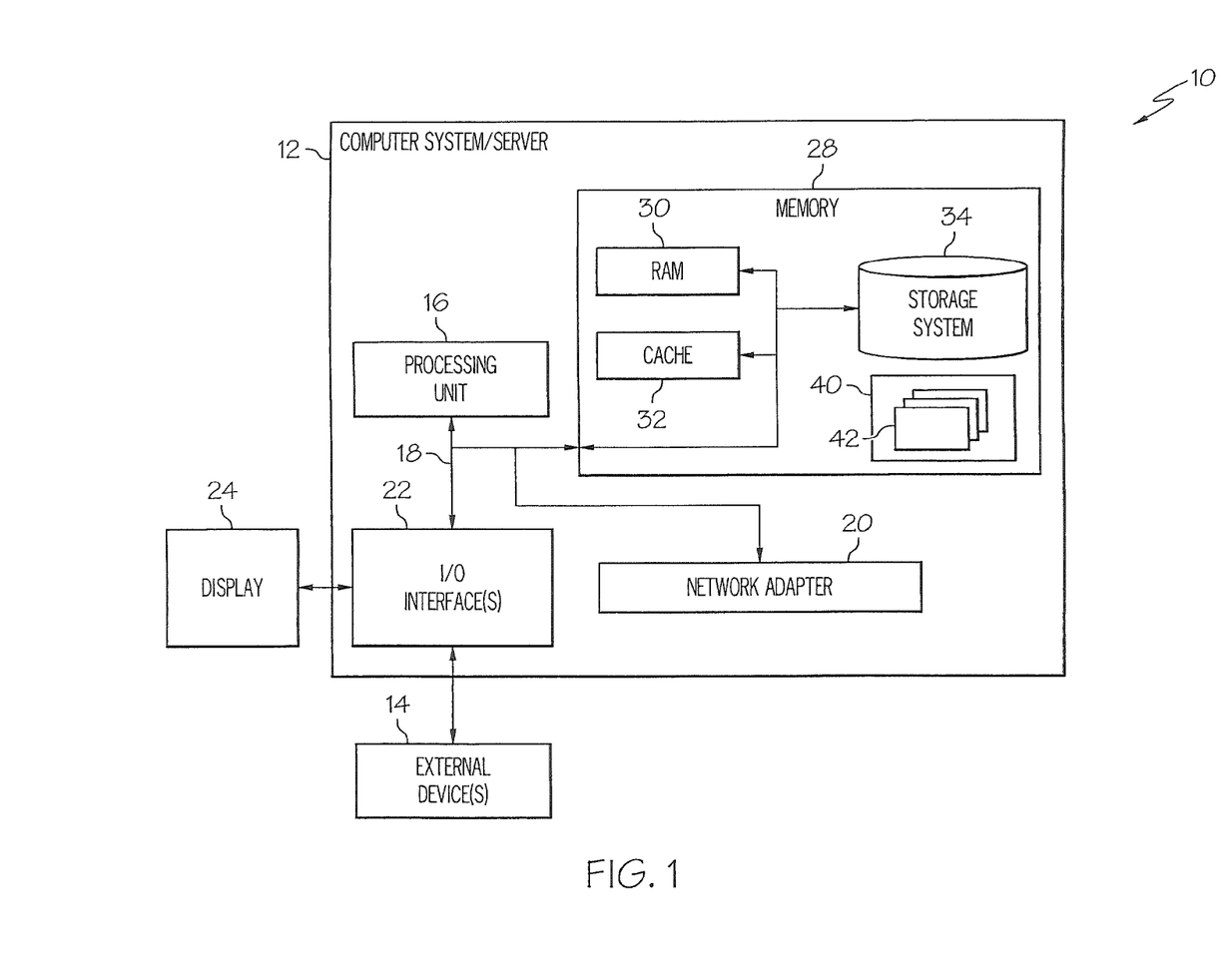
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out some of the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
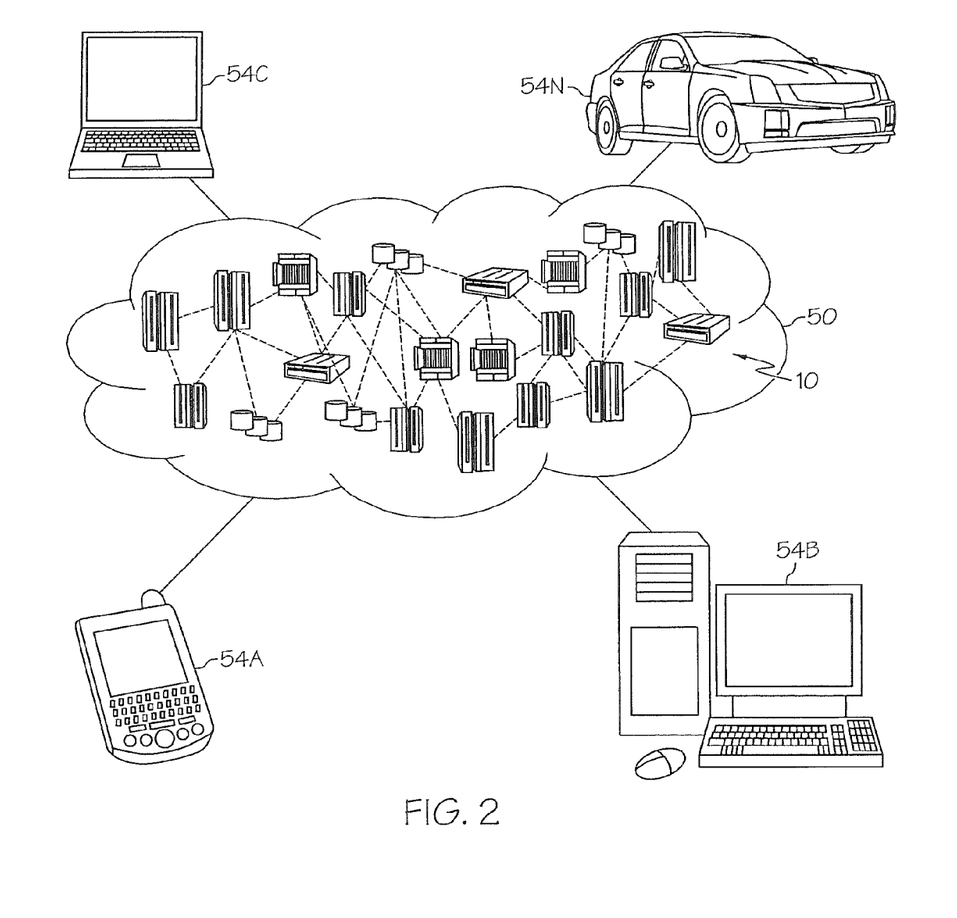
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
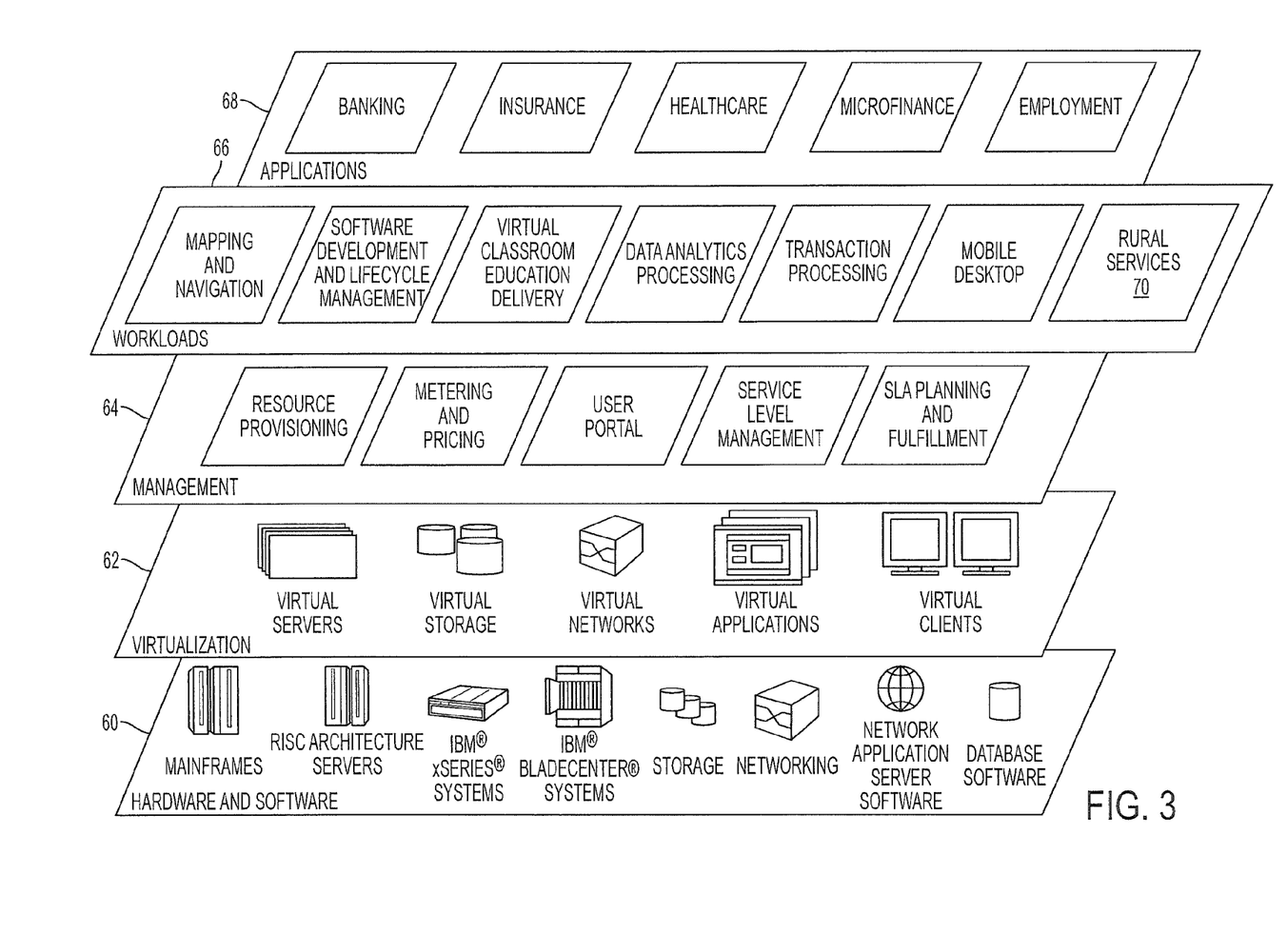
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; a mobile desktop for mobile devices (e.g., 54A, 54C, and 54N, as well as mobile nodes 10 in cloud computing environment 50) accessing the cloud computing services, and rural services 70, to name a few.

In an exemplary embodiment, a rural services application 70 in the workloads layer 66 implements the rural services described herein. The rural services may be implemented as many different applications or as components within a single application, as will be described herein. For purposes of illustration, the rural services are shown in FIG. 3 as being implemented by a single application (i.e., rural services application 70).

The rural services application 70 operates as a middleware tool for facilitating a variety of functions and tasks in furtherance of the rural services. These functions and tasks are implemented through an application layer 68 as, e.g., banking services, insurance services, healthcare services, micro-finance, and employment, to name a few. The rural services application 70 provides security, synchronization, device management and integration, communications, analytics, and customer profile management functions for end users and related parties, as will be described further in FIGS. 4 and 5.

Figure 4:
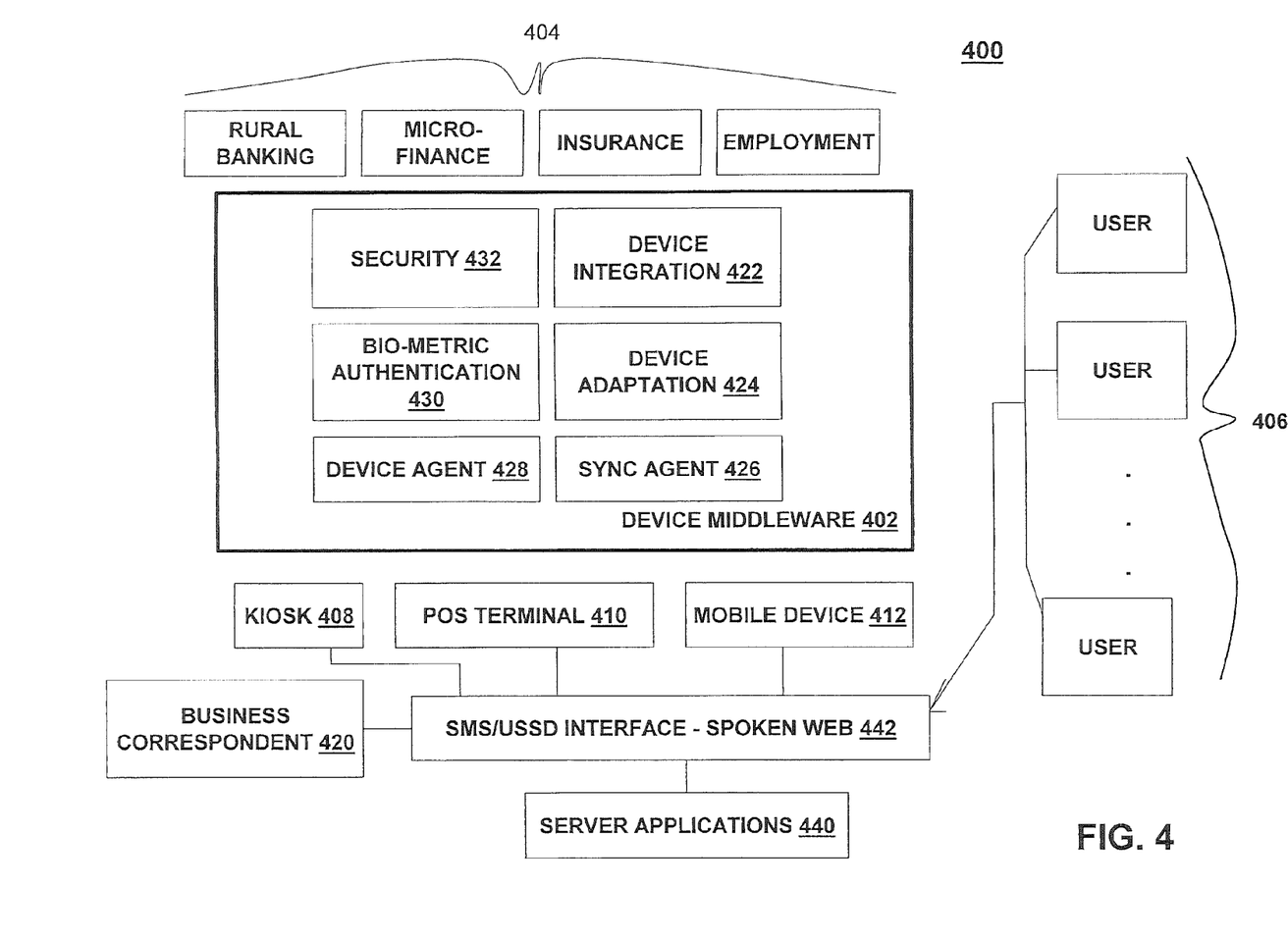
FIG. 4 depicts a block diagram of a client-side platform in accordance with an embodiment of the present invention.
Figure 5:
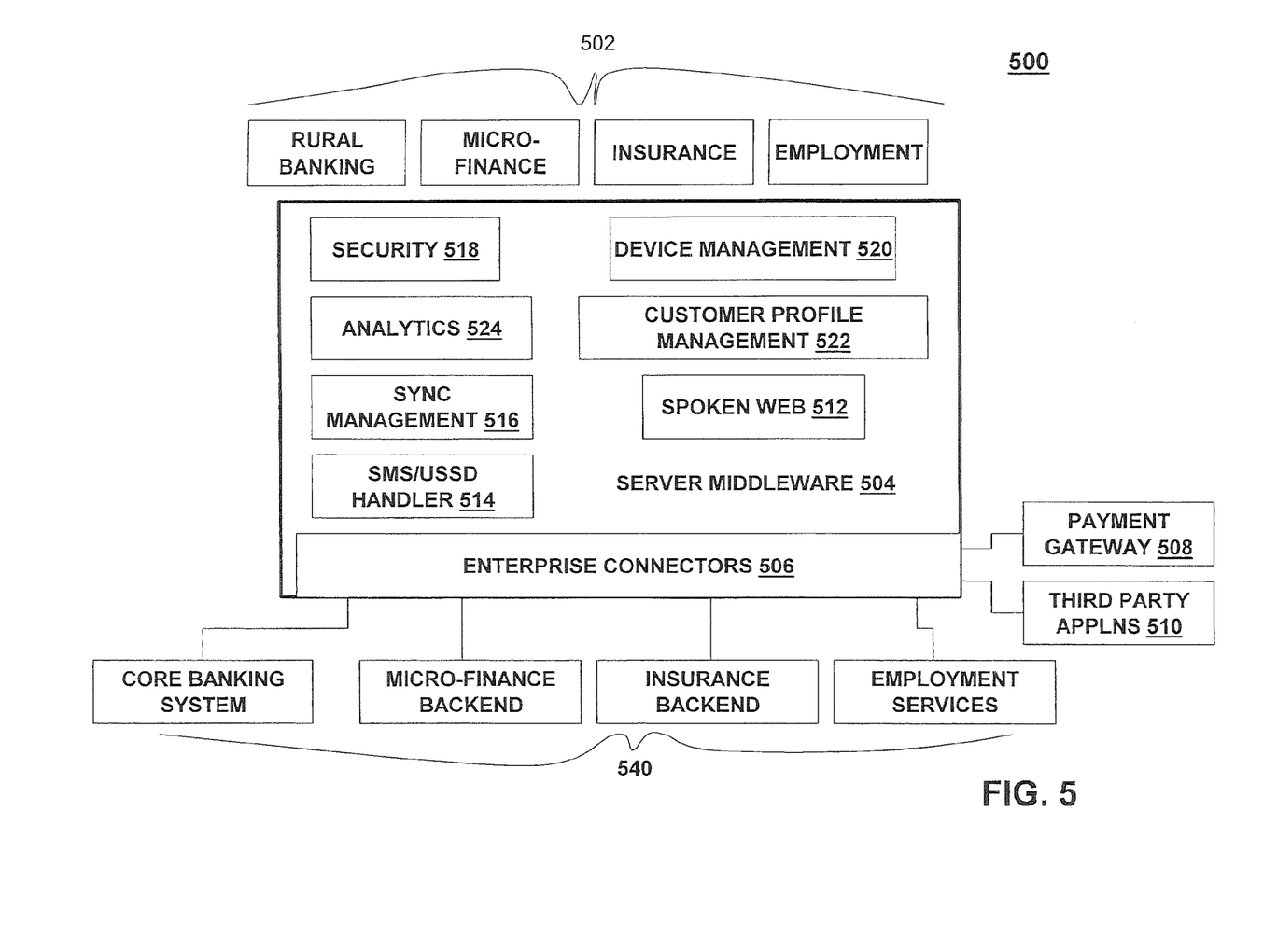
FIG. 5 depicts a block diagram of a server-side platform in accordance with an embodiment of the present invention.

FIG. 4 illustrates a client-side platform 400 of the rural services, and FIG. 5 illustrates a server-side platform 500 of the rural services in an embodiment of the invention. Collectively, the platforms 400 and 500 comprise the exemplary rural services platform described herein.

The client-side platform 400 may be implemented in hardware and software. The client-side platform 400 includes device middleware 402 and a set of applications 404 (e.g., shown in FIG. 4 as banking, micro-finance, insurance, and employment) offered to rural consumers (e.g., users 406). It will be understood that other applications 404 may be implemented such as, by way of non-limiting examples, those shown in the application layer 68 of FIG. 3.

The rural consumers 406 may interact through a variety of devices, such as kiosks 408, point-of-sale (PoS) terminal 410, and mobile communication devices 412 (e.g., personal digital assistants, smart phones, laptops, netbooks, etc.). In addition, one or more of these devices may be operated by a business correspondent 420. A business correspondent may be an agent or broker of a service provider (e.g., a service provider providing the services directed to one of the applications 404). The devices 408, 410, and 412 may correspond to the devices 54A-54N of FIG. 2.

In the exemplary client-side platform 400, each of these devices 408, 410, and 412 executes the device middleware 402, which in turn provides a common set of features to applications 404 executing on this middleware 402. The device middleware 402 includes a set of application programming interfaces (APIs) through which applications 404 communicate with the middleware components, which components will now be described. The middleware 402 includes a device integration component 422 that hides the heterogeneity typically associated with APIs across devices for accessing various device capabilities such as a fingerprint reader, scanner, printer, etc. Also, a device adaptation component 424 provides capabilities to identify devices by their characteristics and transparently adapt an application (e.g., one of applications 404) based on the device (e.g., one of the devices 408, 410, and 412. For example, a user interface of the application (e.g., application 404) can be transparently adapted to suit the device on which it is executing. This makes the application portable across these devices.

The rural services client-side platform 400 provides support for disconnected operations, e.g., no network connectivity and unreliable power supply. The rural services' middleware 402 includes a sync agent 426 that allows the applications 404 to work in a disconnected mode and then synchronizes the data when connectivity is available For example, a user of one of the devices 408, 410, and 412 is executing one of the applications 404 offline, and the offline activities are logged and recorded locally by the devices (e.g., in internal memory). When the sync agent 426 determines that the device is connected to a network, the sync agent 426 synchronizes the data in the local storage with a corresponding server in the network. Also, the since the middleware 402 is available on a host of battery-operated devices (e.g., netbooks, handheld devices, etc.), it does not require access to a continuous and reliable power supply. The device middleware 402 also includes a device agent 428 that provides remote management of these devices through an administrator who may install new applications remotely, push updates, etc. Also, in case a device is lost or stolen, the data and application can be remotely deleted.

Standard authentication schemes (e.g., user id and password combinations) may present challenges to some rural users. The middleware 402 includes a biometric authentication mechanism 430 that provides capabilities for fingerprint registration and verification, which can be used by the applications 404 to authenticate users 406. This minimizes the risks of fraud by a business correspondent or other individuals. In case on-line connectivity is available, this component 430 can also use technologies, such as Universal IDs (UIDs) of a user for authentication. To enable security of data stored on the devices, a security component 432 provides the ability to encrypt the data, both during storage on the device as well as while synchronizing with the server. In this manner, the business correspondent 420 is unable to tamper with the data in any manner.

The end-users can also interact directly with the backend system of the rural services (e.g., server applications 440) using a variety of interface techniques, such as short messaging service (SMS), unstructured supplementary service data (USSD), or a voice (e.g., spoken web) channel (collectively referred to as interface 442). This allows them to directly perform a host of transactions such as balance inquiry, funds transfer, etc. Also, for each of the transactions performed through the business correspondent 420, the users get an SMS (and/or a Voice call) related to it when the data is synchronized with the server. The voice channel allows users to interact in their local language with the system.

Turning now to FIG. 5, the server-side platform 500 may be implemented in hardware and software (e.g., by one or more of nodes 10 in FIG. 1), as well as through devices and resources shown in the layers 60, 62, 64, 66, and 68 of FIG. 3. The server-side platform 500 may be implemented via one or more cloud computing nodes in cloud computing environment 50. In this embodiment, the rural services application 70 may be executed via program modules 42 (FIG. 1). The rural services may be provided to the device (e.g., devices 408, 410, and 412).

The server-side platform 500 includes server applications 502 that support client applications for banking, insurance, etc., middleware 504, and connectors 506 (e.g., software components) that connect to back-end systems 540 of enterprises that provide services such as banking, micro-finance, insurance, employment, etc. Through the use of such connectors 506, various third party application service providers, as well as back-end systems 540, can offer their services on the platform 500 (e.g., by allowing third party applications 502 and server-side applications 510) to communicate through the server middleware 504 to corresponding back-end systems 540. Moreover, the server-side platform 500 includes a payment gateway 508 through which end users may pay for availing different services on the platform 500. The server middleware 504 provides a set of common services through which a service provider (banking, insurance, etc.) can offer its services to the end users.

The various components of the middleware 504 will now be described in an exemplary embodiment. A spoken web component 512 allows initiation and receiving of voice calls in the local language. Spoken web 512 is a voice-driven ecosystem parallel and complementary to that of the World Wide Web (WWW). It is a network of VoiceSites that are voice driven applications created by users themselves and hosted in the network. The VoiceSites are identified by global identifiers call VoiNumbers and may be interconnected through VoiLinks Various service providers (e.g., those hosting the server applications 502) on the platform 500 can create their VoiceSites through which they can share information and interact with those who may be illiterate or semi-literate, and may interact with these users in the local languages.

An SMS/USSD handler component 514 allows functionality for sending and receiving of SMS messages and interaction through a USSD channel. This component 514, along with the spoken web component 512, allows a user to interact directly with the back-end system (e.g., one of back-end systems 540) and perform a host of transactions using a land-line or mobile phone. A sync management component 516 allows data and transactions from the client devices (e.g., devices 408, 410, and 412 of FIG. 4) to be synchronized with the server. When the data is synchronized, the corresponding server-side application (e.g., application(s) 502) executes these transactions on the back-end system 540 using enterprise connectors 506. This process completes the transaction, and a corresponding success or failure is reported to the end user using SMS or voice channel (e.g., via SMS/USSD handler 514). A security component 518 enables data to be encrypted before being stored on the server or while transferring to back-end systems 540.

Certain administrative tasks may need to be performed on the devices (e.g., devices 408, 410, and 412), such as updating applications 404, installing new applications, locking devices, data wipe-out, etc. Since the actual devices are located in geographically disperse or rural areas, it would be prohibitively expensive for a platform owner to manage these devices on-site by sending an administrator. The server middleware 504 provides a device management component 520 that allows an administrator to management the client remotely. Each device has a device agent (e.g., device agent 428 of FIG. 4) installed as part of the client middleware 402. An administrator accesses the device management component 520 to send commands wirelessly to the agent device 428 using standard protocols. The administrator sends appropriate commands and data to that agent 428 based on the desired task to perform these operations. This can significantly reduce the cost of managing this system.

A customer profile management component 522 allows a common repository of customer profile and data across various services offered through this platform 500. In essence, an end user may register once with the platform 500 to use any of the offered services. This reduces the overhead of registering for each individual service and verification of user data. Also, a common user view is provided across services thereby enabling useful analytics to be performed such as product recommendation, cross-sell, up-sell, inferring spending patterns, etc. An analytics component 524 performs such analysis, and assists in fine-tuning existing offerings, as well as launching new ones effectively.

Figure 6:
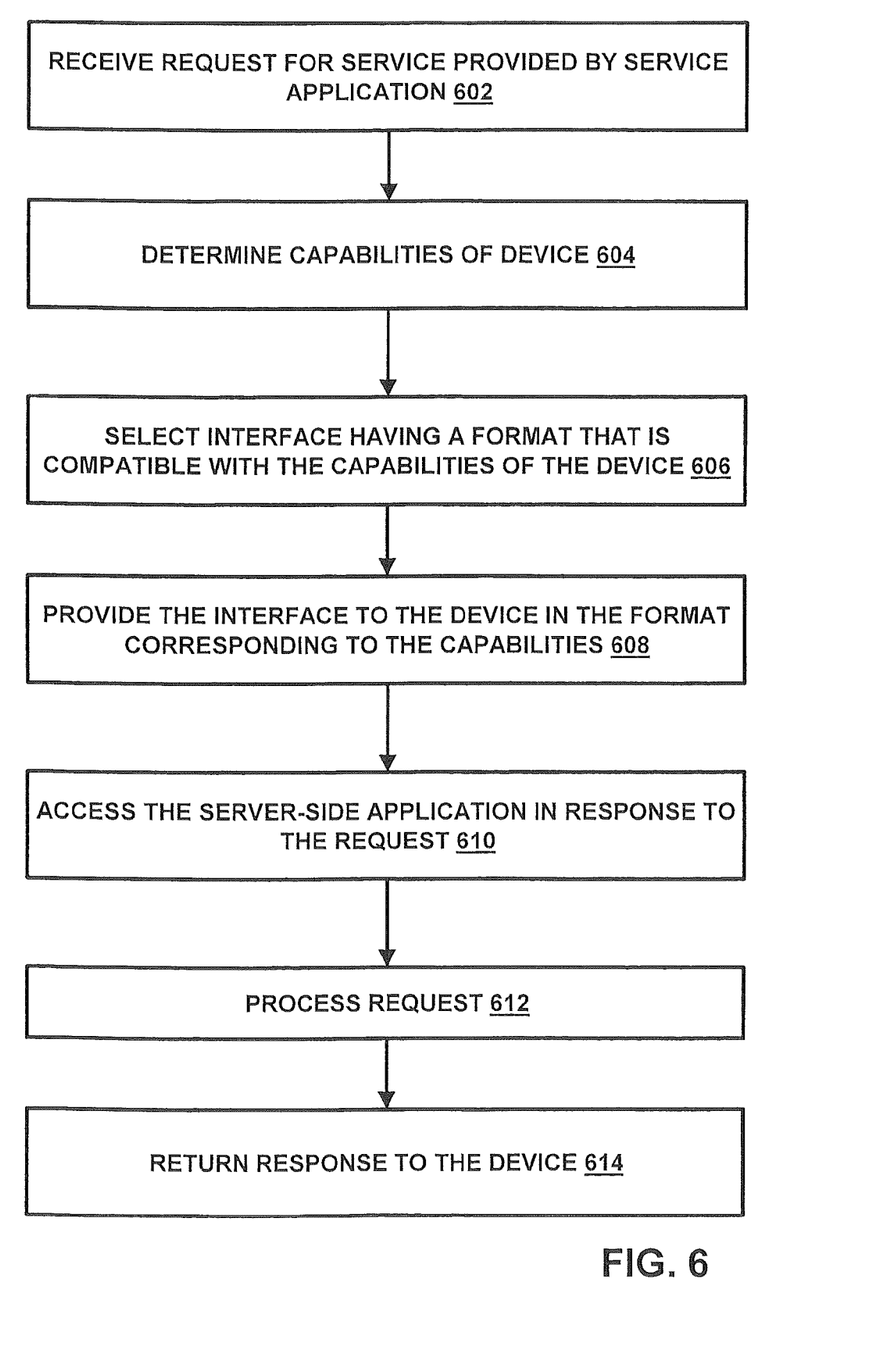
FIG. 6 depicts a flow diagram illustrating a process for implementing rural services in accordance with an embodiment of the present invention.

Turning now to FIG. 6, a flow diagram describing a process for implementing the rural services will now be described in an exemplary embodiment. The process described in FIG. 6 relates to a client-side implementation (e.g., through the client-side platform 400 of FIG. 4). In this embodiment, the rural services application 70, in conjunction with applications 404, are executed via an end user device.

At step 602, the rural services application 70, via the device middleware 402, receives a request for a service from an end user. The request may be directed to any of the services provided by the applications 404, such as a request to conduct a banking transaction, a request for an insurance claim, etc. Alternatively, the operator of the device may be a business correspondent 420 who initiates tasks for end users on behalf of one or more service providers. The request may be facilitated by a common interface that includes user-selectable options for each of the applications 404 (e.g., via representational icons) provided to the device by the device middleware 402. The application 404 for which the request is received communicates with the device middleware 402 through an API configured via the device middleware 402.

At step 604, the device adaptation component 424 identifies the characteristics and capabilities of the device. For example, different types of devices may operate using different communications protocols and through different channels, as well as using different operating systems and related components. By way of illustration, a personal digital assistant (e.g., mobile device 412 of FIG. 4) may communicate over a cellular network and/or a satellite network. Further, the personal digital assistant may execute an operating system that is different from that of a kiosk (e.g., kiosk 408) or POS terminal (e.g., POS terminal 410). The device adaptation component 424 transparently adapts the application 404 for the requested service (e.g., one of applications 404) based on these device characteristics via an interface that corresponds to the identified device characteristics at step 606 (e.g., identifies an appropriate interface), and provides the interface to the device at step 608.

At step 610, the middleware 404 accesses the server-side application 502 corresponding to the request, the application 502 processes the request through the server middleware 504 at step 612, and returns a response to the device based on the nature of the processed request, or transaction, via step 614. For example, the response may be a notification of a successful execution of the request.

In addition to identification of device characteristics and capabilities, and also the adaptation of the application 404 for the requested service, the device middleware 404 provides numerous additional functions for the end user (or other end users) via the aforementioned components 422, 426, 428, 430, and 432 described in FIG. 4. The device middleware 404 enables end users who may be technologically disadvantaged (e.g., in IT-related matters and devices) and/or those living in remote or rural communities the opportunity to conduct transactions and communications with a number of service providers via these components. In one embodiment, the device middleware 404 enables end users who may be technologically disadvantaged to easily authenticate themselves with a service provider in preparation of conducting a secure transaction (e.g., a bank transaction). The bio-metric authentication component 430 and the device integration component 422 collectively provide the end user with the ability to access secure services by authentication through biometric scanning (e.g., fingerprint scanning), such that the end users do not need to perform tedious account set up processes typically associated with secure accounts (e.g., user name and password combinations, digital certificates, etc.). The device integration component 422 enables the user, e.g., to authenticate through any authentication system elements (scanner, reader, etc.) that may be resident on the device through which the authentication is desired. The bio-metric authentication component 430 provides capabilities for initiating fingerprint registration and verification. In addition, the end users can authenticate through voice and/or text messaging protocols. For example, an end user who is technologically disadvantaged may communicate (and conduct transactions) through SMS/USSD or voice channels (e.g., spoken web) using their own mobile phones.

Other functions provided by the device middleware 404 are security and synchronization of data. The security component 432 provides the ability to encrypt the data, both during storage on the device as well as while synchronizing with the server (e.g., via the sync agent component 426). This enables security in preventing others from tampering with the end user's data. In addition, the sync agent component 426 ensures no data is lost when the end user is working offline. In remote or rural areas, reliable network connectivity can be an issue. The sync agent component 426 synchronizes the data from the end user device with end user data stored on the network. Another function provided by the device middleware 404 includes remote management of devices through an administrator who may install new applications remotely, push updates, etc. Also, in case a device is lost or stolen, the data and application can be remotely deleted. In this manner, end users who reside in remote or rural locations may receive any updates or modifications to device software despite their geographic isolation.

As indicated above, the server-side platform 500 also implements rural services functions through its server middleware 504. The server-side platform 500 facilitates transactions through server applications 502 (also referred to herein as "service applications") on behalf of back-end systems 540. The server-side platform 500 enables communications relating to transactions with end user devices via text or voice components of the server middleware 504. The server middleware 504 provides security, synchronization management, device management, customer profile management, and analytics, as described above. In addition, the server middleware 504 provides registration for use of the service applications and storing transaction related data, as well as end user data in a repository that services a plurality of service applications. The server middleware 504 communicates these transactions with respect to corresponding back-end systems 540. The server middleware 504 offers the services of the service applications to end users once the end users have registered for these services (e.g., through the customer profile management component 522).

Technical effects of the invention include a middleware framework and architecture for providing services to end users who may be living in remote or rural locations, and who may be technologically disadvantaged or have language barriers. The middleware architecture seamlessly provides various disparate services through the use of integrated authentication, security, synchronization, communication and device management tools. These tools interoperate to ensure data integrity when connectivity is lacking, as well as simplified authentication mechanisms.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for providing services to a rural region, the system comprising:
   a computer located in the rural region; and
   a middleware platform executable by the computer, the middleware platform comprising components configured in logic to implement a method, the method comprising:
   receiving a request for a service, the service provided by a service application in communication with the middleware platform;
   determining, via a device adaptation component of the middleware platform, capabilities of a device subject to the request;
   selecting an interface having a format that is compatible with the capabilities of the device, and providing the interface to the device in the format corresponding to the capabilities;
   accessing the service application responsive to the request, the service application including at least one of a banking application, a micro-finance application, an insurance application, and an employment application;
   processing the request; and
   returning a response, via the interface, to the device responsive to the processing;
   wherein the middleware platform further implements:
   identifying transient connectivity with a communications network servicing the device;
   buffering data subject to the processing in a storage component of the device; and
   synchronizing buffered data, via a sync agent component of the middleware platform, with a network server.

2. The system of claim 1, wherein the device includes a mobile device operated by a business correspondent.

3. The system of claim 1, wherein the device includes a kiosk.

4. The system of claim 1, wherein the middleware platform implements:
   providing bio-metric authentication to a user of the device via a bio-metric authentication component of the middleware platform; and
   encrypting data from the computer, via a security component of the middleware platform, before synchronizing the data with the network server.

5. The system of claim 1, wherein the device includes a point-of-sale terminal.

6. A method for providing services to a rural region, the method comprising:
   receiving a request for a service, the service provided by a service application in communication with a middleware platform, the middleware platform executable by a computer and comprising components configured in logic, the computer located in the rural region;
   determining, via a device adaptation component of the middleware platform, capabilities of a device subject to the request;
   selecting an interface having a format that is compatible with the capabilities of the device, and providing the interface to the device in the format corresponding to the capabilities;
   accessing the service application responsive to the request, the service application including at least one of a banking application, a micro-finance application, an insurance application, and an employment application;
   processing the request; and
   returning a response, via the interface, to the device responsive to the processing;
   wherein the method further comprises:
   identifying, via the middleware platform, transient connectivity with a communications network servicing the device;
   buffering data subject to the processing in a storage component of the device; and
   synchronizing buffered data, via a sync agent component of the middleware platform, with a network server.

7. The method of claim 6, wherein the device includes a mobile device operated by a business correspondent.

8. The method of claim 6, wherein the device includes a kiosk.

9. The method of claim 6, further comprising:
   providing bio-metric authentication to a user of the device via a bio-metric authentication component of the middleware platform; and
   encrypting data from the computer, via a security component of the middleware platform, before synchronizing the data with the network server.

10. The method of claim 6, wherein the device includes a point-of-sale terminal.

11. A computer program product for providing services to a rural region, the computer program product comprising a non-transitory computer-readable medium having computer-readable instructions embodied thereon, which when executed by a computer in the rural region, cause the computer to implement a method, the method comprising:
    receiving a request for a service, the service provided by a service application in communication with a middleware platform configured with the computer-readable instructions;
    determining, via a device adaptation component of the middleware platform, capabilities of a device subject to the request;
    selecting an interface having a format that is compatible with the capabilities of the device, and providing the interface to the device in the format corresponding to the capabilities;
    accessing the service application responsive to the request, the service application including at least one of a banking application, a micro-finance application, an insurance application, and an employment application;
    processing the request; and
    returning a response, via the interface, to the device responsive to the processing;
    wherein the computer program product further comprises instructions for:
    identifying transient connectivity with a communications network servicing the device;
    buffering data subject to the processing in a storage component of the device; and
    synchronizing buffered data, via a sync agent component of the middleware platform, with a network server.

12. The computer program product of claim 11, wherein the device includes a mobile device operated by a business correspondent.

13. The computer program product of claim 11, wherein the device includes a kiosk.

14. The computer program product of claim 11, further comprising instructions for:
    providing bio-metric authentication to a user of the device via a bio-metric authentication component of the middleware platform; and
    encrypting data from the computer, via a security component of the middleware platform, before synchronizing the data with the network server.

15. The computer program product of claim 11, wherein the device includes a point-of-sale terminal.

16. A system for providing services to a rural region, the system comprising:

a computer; and a middleware platform executable by the computer, the middleware platform comprising components configured in logic to implement a method, the method comprising:

processing a transaction, via a service application of a back-end system, the service application communicating with an end user device through the middleware platform, the end user device located in the rural region, wherein the processing the transaction includes:

conducting communications relating to the transaction with the end user device via one of a text and voice component of the middleware platform;

synchronizing data from the transaction with the service application, via a synchronization component of the middleware platform; and completing the transaction by communicating the synchronized data over a connector coupled to the back-end system;

wherein the middleware platform further implements:

providing registration for use of the service application and storing transaction data and end user data in a repository that services a plurality of service applications including the service application subject to the transaction, the service applications relating to corresponding back-end systems; and providing services offered by the plurality of service applications to the end user via the registration.

17. The system of claim 16, wherein the middleware platform further implements:

using the end user data for a plurality of end users to perform analytics for transactions occurring across the plurality of service applications.

18. The system of claim 16, wherein the service applications include at least one of banking, insurance, micro-finance, and healthcare.

19. The system of claim 16, wherein the middleware platform further implements:

performing remote management of the end user device via a device management component of the middleware platform, the remote management including at least one of updating an application, installing a new application, locking the end user device, and deleting data from the end user device.

20. The system of claim 16, wherein the middleware platform further implements:

providing one of a text and voice interface to a back-end server application and executing a transaction with respect to the back-end server application via the one of the text and voice interface, the transaction executed responsive to processing the request.

\* \* \* \* \*